(12) United States Patent
Li et al.

(10) Patent No.: US 10,137,475 B2
(45) Date of Patent: Nov. 27, 2018

(54) COATING SYSTEM, A METHOD OF APPLYING THE COATING SYSTEM AND AN ARTICLE COMPRISING THE COATING SYSTEM

(71) Applicant: Dow Global Technologies LLC, Midland, MI (US)

(72) Inventors: Yanxiang Li, Midland, MI (US); Paul J. Popa, Auburn, MI (US); John N. Argyropoulos, Midland, MI (US); Sandra Hofmann, Einsiedeln (CH); Ray E. Drumright, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/635,247

(22) Filed: Jun. 28, 2017

(65) Prior Publication Data

US 2017/0291191 A1    Oct. 12, 2017

Related U.S. Application Data

(62) Division of application No. 14/556,299, filed on Dec. 1, 2014, now Pat. No. 9,718,990.

(60) Provisional application No. 61/914,609, filed on Dec. 11, 2013.

(51) Int. Cl.
| | | |
|---|---|---|
| *B32B 27/40* | (2006.01) | |
| *B32B 27/38* | (2006.01) | |
| *B05D 7/00* | (2006.01) | |
| *C09D 175/04* | (2006.01) | |
| *C09D 163/00* | (2006.01) | |
| *C09D 175/12* | (2006.01) | |
| *C09D 161/20* | (2006.01) | |
| *C09D 161/22* | (2006.01) | |
| *C09D 161/32* | (2006.01) | |
| *C08G 71/04* | (2006.01) | |
| *C09D 133/06* | (2006.01) | |
| *C09D 5/00* | (2006.01) | |

(52) U.S. Cl.
CPC ............... *B05D 7/542* (2013.01); *B05D 7/52* (2013.01); *B32B 27/38* (2013.01); *B32B 27/40* (2013.01); *C08G 71/04* (2013.01); *C09D 5/002* (2013.01); *C09D 133/066* (2013.01); *C09D 161/20* (2013.01); *C09D 161/22* (2013.01); *C09D 161/32* (2013.01); *C09D 163/00* (2013.01); *C09D 175/04* (2013.01); *C09D 175/12* (2013.01); *B05D 2503/00* (2013.01); *B05D 2504/00* (2013.01); *Y10T 428/31511* (2015.04)

(58) Field of Classification Search
CPC ....... B32B 27/38; B32B 27/40; C09D 175/12; C09D 161/20; C09D 161/22; C09D 161/32; C09J 161/20; C09J 161/22; C09J 161/32
USPC ............................................... 428/413, 423.1
See application file for complete search history.

(56) References Cited

U.S. PATENT DOCUMENTS

| 4,013,598 A * | 3/1977 | Evans | C04B 41/009 |
| | | | 428/413 |
| 4,265,957 A * | 5/1981 | Severance | E04F 15/12 |
| | | | 404/82 |
| 9,718,990 B2 * | 8/2017 | Li | C08G 71/04 |
| 2016/0130472 A1 * | 5/2016 | Popa | C08G 12/46 |
| | | | 428/339 |

* cited by examiner

*Primary Examiner* — Marc S Zimmer

(57) ABSTRACT

A coating system comprising an epoxy coating layer prepared from an epoxy formulation which comprises an epoxy resin; a curing agent with no more than 4.5 wt % free amine based on a weight solids of the curing agent; and an adjacent layer prepared from a non-isocyanate polyurethane formulation wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors is provided. Also provided are a method of applying a multi-layer coating system and an article comprising a coating system.

8 Claims, No Drawings

COATING SYSTEM, A METHOD OF APPLYING THE COATING SYSTEM AND AN ARTICLE COMPRISING THE COATING SYSTEM

FIELD OF INVENTION

The instant invention relates to a coating system, a method of applying the coating system and an article comprising the coating system.

BACKGROUND OF THE INVENTION

Polyurethane-based coatings which are curable at ambient temperatures have been developed. Such polyurethane based coatings are not produced with the use of isocyanates. Rather, a polycarbamate is crosslinked with a polyaldehyde in the presence of an acid catalyst to form a crosslinked polyurethane coating, herein called a "non-isocyanate polyurethane coating." When used with typical epoxy primers or mid-coats, non-isocyanate polyurethane-based topcoats may show decreased performance in comparison to such topcoats placed on unprimed substrates. A primer and/or midcoat coating layer which does not exhibit such decreased performance would be useful.

SUMMARY OF THE INVENTION

The instant invention is a coating system, a method of applying the coating system and an article comprising the coating system.

In one embodiment, the instant invention provides a coating system comprising: an epoxy coating layer prepared from an epoxy formulation which comprises epoxy resin; curing agent with no more than 4.5 wt % free amine based on a weight solids of the curing agent; and optionally, one or more additives selected from the group consisting of solvent, reactive diluent, plasticizer, pigment, filler; rheology modifiers, dispersants, surfactants, UV stabilizers, and corrosion inhibitors; and a topcoat layer prepared from a nonisocyanate polyurethane formulation.

DETAILED DESCRIPTION OF THE INVENTION

The instant invention is a coating system, a method of applying the coating system and an article comprising the coating system.

The coating system according to the present invention comprises (A) an epoxy coating layer prepared from an epoxy formulation which comprises (a1) epoxy resin; and (a2) curing agent with no more than 4.5 wt % free amine based on a weight solids of the curing agent; (B) an adjacent coating layer prepared from a non-isocyanate polyurethane formulation; and wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors. As used herein, the term adjacent layer means that the non-isocyanate polyurethane formulation is coated directly onto the fully or partially cured epoxy formulation with no intervening layers.

In an alternative embodiment, the instant invention further provides a method of applying a multi-layer coating system comprising: (I) selecting an epoxy formulation which comprises (a1) epoxy resin; (a2) curing agent with no more than 4.5 wt % free amine based on a weight solids of the curing agent; (II) applying the epoxy formulation onto a substrate; (III) fully or partially curing the epoxy formulation to produce an epoxy coating layer; (IV) selecting a non-isocyanate polyurethane formulation; (V) applying the non-isocyanate polyurethane formulation onto the epoxy coating layer; and (VI) allowing the topcoat formulation and epoxy formulation to fully cure thereby forming a multi-layer coating system, wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

In another alternative embodiment, the instant invention further provides an article comprising: a substrate which comprises a surface, an epoxy coating layer on the surface and prepared from an epoxy formulation which comprises an epoxy resin; a curing agent with no more than 4.5 wt % free amine based on weight solids of the curing agent; and a non-isocyanate polyurethane coated onto the epoxy coating layer; wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

Epoxy Resins

Any epoxy resin may be used in embodiments of the invention. Epoxy resins include pre-polymers and polymers having at least two epoxide groups. Exemplary epoxy resins well known in the art include bisphenol A epoxy resins, bisphenol F epoxy resins, novolac epoxy resins, glycidylamine epoxy resins, aliphatic epoxy resins. One or more than one epoxy resins may be used in embodiments of the invention. Exemplary commercial epoxy resins include those available under the designation D.E.R., available from The Dow Chemical Company.

Curing Agents

The curing agent used in embodiments of the present invention may be made by any method provided the free amine amount limitation is met. The curing agent includes amine adducts, amides, polyamides and Mannich bases derived from polyfunctional amines and selected from the group consisting of aromatic amines, cycloaliphatic amines, ethyleneamines, aliphatic amines, and combinations thereof. Exemplary commercial epoxy curing agents include epoxy ethyleneamine adducts such as GRILONIT H 84026 and Grilonit H84055, available from EMS-GRILTECH, a subsidiary of EMS-CHEMIE AG (Switzerland) The curing agent used in embodiments of the invention contain equal to or less than 4.5 wt % free amine. As used herein, the term "free amine" in connection with the curing agent refers to the amount of unreacted amine used to make the curing agent which remains in the curing agent following its production.

All individual values and subranges from with equal to or less than 4.5 wt % free amine in the curing agent based on weight solids of the curing agent are included herein and disclosed herein; for example, the amount of free amine can be from an upper limit of 4.5, 4, 3.5, 3, 2.5, 2, or 1.5 wt %. In an alternative embodiment, the amount of free amine in the curing agent is from a lower limit of 0 wt %; for example, the amount of free amine can be from a lower limit of 0, 0.1, 0.2, 0.3, 0.4 or 0.5 wt %. In an alternative embodiment, the free amine is present in an amount from of from 0 to 4.5 wt %, or in the alternative, the amount of free amine in the curing agent may be in the range of from 2 to 4 wt %, or in the alternative, the amount of free amine in the curing agent may be in the range of from 0 to 2.5 wt %.

In an alternative embodiment, the instant invention provides a coating system, a method of applying the same, and articles made therefrom, in accordance with any of the preceding embodiments, except that the epoxy formulation comprises 10 to 90 wt % component epoxy resin; and from 0.6 to 1 amine molar equivalents of curing agent relative to epoxy equivalents of epoxy resin. All individual values and subranges from 10 to 90 wt % epoxy resin are included herein and disclosed herein; for example, the amount of epoxy resin in the epoxy formulation can be from a lower limit of 10, 15, 20, 30, 40, 50, 60, 70 or 80 wt % to an upper limit of 15, 25, 35, 45, 55, 65, 75, 85 or 90 wt %. For example, the amount of epoxy resin in the epoxy formulation may range from 10 to 90 wt %, or in the alternative, the amount of epoxy resin in the epoxy formulation may range from 10 to 50 wt %, or in the alternative, the amount of epoxy resin in the epoxy formulation may range from 50 to 90 wt %, or in the alternative, the amount of epoxy resin in the epoxy formulation may range from 30 to 75 wt %. All individual values and subranges from 0.6 to 1 amine molar equivalents of curing agent are included herein and disclosed herein. For example, the amount of curing agent can be 0.6 amine molar equivalents of curing agent relative to epoxy equivalents of epoxy resin, or in the alternative, the amount of curing agent can be 0.7 amine molar equivalents of curing agent relative to epoxy equivalents of epoxy resin, or in the alternative, the amount of curing agent can be 0.8 amine molar equivalents of curing agent relative to epoxy equivalents of epoxy resin, or in the alternative, the amount of curing agent can be 0.9 amine molar equivalents of curing agent relative to epoxy equivalents of epoxy resin, or in the alternative, the amount of curing agent can be 1 amine molar equivalents of curing agent relative to epoxy equivalents of epoxy resin.

In an alternative embodiment, the instant invention provides a coating system, a method of applying the same, and articles made therefrom, in accordance with any of the preceding embodiments, except that the epoxy layer comprises pigment volume concentration ("PVC") of from 10 to 40%. All individual values and subranges from 10 to 40% are included herein and disclosed herein; for example, the epoxy layer may comprise PVC from a lower limit of 10, 25, 30 or 35% to an upper limit of 12, 22, 32 or 40%. For example, the PVC may range from 20 to 40%, or in the alternative, the PVC may range from 20 to 30%, or in the alternative, the PVC may range from 30 to 40%, or in the alternative, the PVC may range from 25 to 35%.

In an alternative embodiment, the instant invention provides a coating system, a method of applying the same, and articles made therefrom, in accordance with any of the preceding embodiments, except that the non-isocyanate polyurethane is the reaction product of a polycarbamate having an average of 2.0 or more carbamate functional groups; a polyaldehyde or an acetal or hemiacetal thereof, and an effective amount of a triggering agent cured at a temperature of from −20° C. to 80° C. In such alternative embodiment, the polycarbamate used in producing the non-isocyanate polyurethane has an average of equal to or greater than 2.0 carbamate functional groups.

Polycarbamates

The polycarbamate used in making the non-isocyanate polyurethane used in some embodiments of the invention may have an average of 2.0 or more carbamate groups, or an average of three or more carbamate groups, or an average of four or more carbamate groups. The carbamate functionality is equal to the number average molecular weight of the polycarbamate divided by the carbamate equivalent weight (CEW). The number average molecular weight of the polycarbamate can be determined by gel permeation chromatography (GPC). The carbamate equivalent weight (CEW) is calculated using equation 1.

$$\text{CEW} = [\text{OH EW}_{polyol} + (43 \times \text{Carbamate Conversion})] \div \text{Carbamate Conversion} \quad \text{(Eqn. 1)}$$

For equation 1, OH $\text{EW}_{polyol}$ is the hydroxyl equivalent weight of the polyol and carbamate conversion is calculated using equation 2.

$$\text{Carbamate Conversion} = (\text{OH\#}_{polyol} - \text{OH\#}_{polycarbamate}) \div \text{OH\#}_{polyol} \quad \text{(Eqn. 2)}$$

For equation 2, $\text{OH\#}_{polyol}$ and $\text{OH\#}_{polycarbamate}$ are the hydroxyl numbers of the polyol and the polycarbamate, respectively. Hydroxyl number is determined by following ASTM D4274-05 (Standard Test Methods for Testing Polyurethane Raw Materials: Determination of Hydroxyl Numbers of Polyols, 2005) and is expressed as number of milligrams of potassium hydroxide (KOH) per gram of test substance (mg KOH/g).

The polycarbamate can be acyclic, straight or branched; cyclic and nonaromatic; cyclic and aromatic, or a combination thereof. In some embodiments the polycarbamate comprises one or more acyclic, straight or branched polycarbamates. For example, the polycarbamate may consist essentially of one or more acyclic, straight or branched polycarbamates.

In one embodiment, the polycarbamate consists essentially of carbon, hydrogen, nitrogen, and oxygen atoms. In another embodiment, the polycarbamate consists of carbon, hydrogen, nitrogen, and oxygen atoms.

The polycarbamate may be prepared by (a) reacting a polyol with methyl carbamate or urea to give the polycarbamate; (b) reacting a polyisocyanate with a hydroxy($C_2$-$C_{20}$)alkyl-carbamate to give the polycarbamate; or (c) reacting a hydroxy($C_2$-$C_{20}$) alkyl-carbamate with (meth)acrylic anhydride to give a carbamoylalkyl (meth)acrylate, and then polymerizing the carbamoylalkyl methacrylate with one or more acrylic acid monomers to give the polycarbamate as a polyacrylic-based polycarbamate. Examples of acrylic monomers are acrylic acid, ($C_1$-$C_{20}$)alkylacrylic acid (e.g., the ($C_1$)alkylacrylic acid is methacrylic acid), and ($C_1$-$C_{20}$) alkyl acrylate (i.e., acrylic acid ($C_1$-$C_{20}$)alkyl ester, e.g., ($C_1$)alkyl acrylate means methyl acrylate). Not shown in Scheme (c), other olefinic monomers (e.g., styrene) can also be employed along with the acrylic monomer, thereby preparing the polycarbamate as a poly(acrylic other olefinic monomer)-based polycarbamate.

The polycarbamates produced in (a) to (c) typically will have different structures. Examples of these reactions are illustrated graphically below in respective Schemes (a) to (c):

Scheme (a):

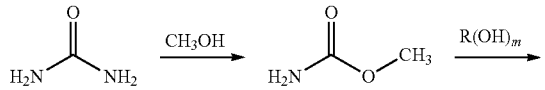

-continued

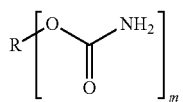

wherein m is as defined for Scheme (a) and R(OH)$_m$, where m is 2 or greater.

Scheme (b):

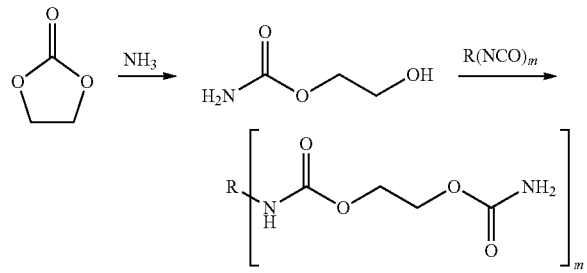

wherein m is an integer of from 2 or greater. Preferably m is an integer of from 2 to 20. In some embodiments m is 2 or 3.

Scheme (c):

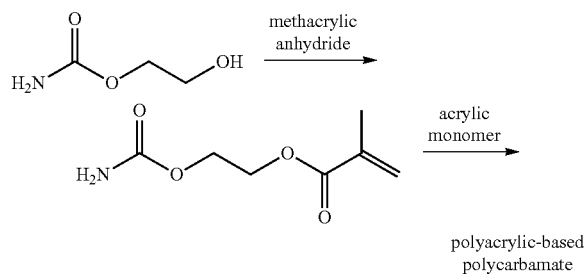

In a particular embodiment, each of the one or more acyclic, straight or branched polycarbamates is prepared by reacting one or more polyols with an unsubstituted carbamic acid alkyl ester or urea to yield the one or more acyclic, straight or branched polycarbamates. Suitable polyols may be (meth)acrylic polyols (i.e., a methacrylic or acrylic polyol), polyalkylene polyols, polyether polyols (e.g., a poly(oxyalkylene) such as a poly(oxyethylene), such as a poly(ethylene glycol), polyester polyols, or polycarbonate polyols. In another embodiment, the polycarbamate comprises one or more cyclic, nonaromatic polycarbamates. In another embodiment, the polycarbamate consists essentially of one or more cyclic, nonaromatic polycarbamates.

In some embodiments each of the one or more cyclic, nonaromatic polycarbamates is a N,N',N"-trisubstituted-cyanuric acid derivative, wherein each substituent thereof independently is of formula: $H_2NC(=O)O—(CH_2)_n—OC(=O)NH—CH_2—((C_3-C_{12})cycloalkyl)CH_2—$, wherein n is an integer of from 2 to 20. Preferably each n independently is an integer of from 2 to 12 and each cyclohexylene independently is a 1,3-cyclohexylene or 1,4-cyclohexylene.

In one embodiment, the polycarbamate is substantially isocyanate free. Presence or absence of molecules containing isocyanate groups can be readily determined by Fourier Transform Infrared (FT-IR) spectroscopy or carbon-13 nuclear magnetic resonance ($^{13}$C-NMR) spectroscopy. Where an isocyanate group-containing reactant is employed, the polycarbamate prepared therefrom is titrated or "quenched" by an isocyanate quenching agent to convert any residual isocyanate groups to carbamates or amines Examples of compounds that could be used as an isocyanate quenching agent are water, sodium hydroxide, methanol, sodium methoxide, and a polyol.

Polyaldehydes

The polyaldehyde used in making the non-isocyanate polyurethane used in some embodiments of the invention may have two aldehyde groups (also referred to herein as a dialdehyde), wherein at least one of the two aldehyde groups reacts with two carbamate groups from the same polyurethane chain (molecule) so as to form the crosslinked polyurethane comprising a plurality of geminal bis(urethane) groups. The two aldehyde groups of the dialdehyde may react with two carbamate groups from two different polyurethane chains so as to form the crosslinked polyurethane comprising a plurality of geminal bis(urethane) groups. Suitable polyaldehydes of the present invention have two, three, four or more aldehyde groups. A polyaldehyde having three aldehyde groups is also referred to herein as a trialdehyde.

The polyaldehyde can include any such molecule having from 2 to 20 carbon atoms or it can have more than 20 carbon atoms, i.e., up to 100, with the proviso that polyaldehydes having more than 20 carbon atoms will have at least one aldehyde group for every 11 carbon atoms, for example, at least one aldehyde group for every 10 carbon atoms. The polyaldehyde can be a cyclic, straight-chained or branched; cyclic and nonaromatic; cyclic and aromatic (e.g., 3-formylbenzaldehyde), or a combination thereof.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, preferably, less than 300 ppm, or, more preferably, less than 200 ppm. The compositions of the present invention may contain so little of resins made from formaldehyde, such as aminoplasts and phenol or resole formaldehyde condensates, that the amount of free formaldehyde in such compositions meets the definition of "substantially formaldehyde free".

In another embodiment, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms. In an alternative embodiment, the polyaldehyde consists essentially of one or more cyclic, nonaromatic polyaldehydes having from 3 to 20 ring carbon atoms.

In another embodiment, each cyclic, nonaromatic polyaldehyde in the multicomponent composition independently has from 5 to 12 ring carbon atoms, and, even more preferably, is a mixture of (cis,trans)-1,4-cyclohexanedicarboxaldehydes and (cis,trans)-1,3-cyclohexanedicarboxaldehydes.

According to one embodiment of the present invention, the polyaldehyde may comprise one or more acyclic, straight-chained or branched polyaldehyde having from 2 to 16 carbon atoms.

In another embodiment, each of the one or more acyclic, straight-chained or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight-chained or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde. The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described later. The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde using the hydroformylating conditions described later. The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde using the hydroformylating conditions described later. The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene. The cyclododecane-1,4,8-tricarbaldehyde can be prepared by a process comprising trimerizing 1,3-butadiene to give 1,4,8-cyclododecatriene, and hydroformylating the 1,4,8-cyclododecatriene using the hydroformylating conditions described later.

The polyaldehyde of the present invention can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfate), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group (>C(OH)$_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. Preferably the hydroformylating step is performed in a manner as generally described in U.S. Pat. No. 6,252,121, which describes an improved separation process.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde in the invention multicomponent composition. In such embodiments, the invention process of preparing the invention crosslinked polyurethane can employ the protected polyaldehyde in place of or in addition to the polyaldehyde and the process can comprise curing the polycarbamate directly with the protected polyaldehyde or the process can optionally further comprise a step of deprotecting the protected polyaldehyde so as to obtain the polyaldehyde in situ, and curing the same with the polycarbamate, as described herein.

Preferably, the polyaldehydes of the present invention are mixtures comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

Other Components in Non-Isocyanate Polyurethane Formulation

In an alternative embodiment, the instant invention provides a crosslinkable composition, method of producing the same, a crosslinked composition made therefrom, a coating made from the crosslinked composition and coated articles in accordance with any of the embodiments disclosed herein, except that the non-isocyanate polyurethane formulation further comprises an acid catalyst. In one embodiment, the acid catalyst is used in an amount of from 0.001 wt % to 10 wt % of the crosslinkable composition, based on the total weight of solids in the composition, or in the alternative, from 0.01 wt % to 5 wt % thereof, or in the alternative, from 0.1 wt % to 2 wt % thereof. Such amounts of the acid catalyst are referred to herein as "effective amounts" of the acid catalyst.

Any acid catalyst suitable for increasing a rate of reaction of a carbamate group (—O—C(=O)—NH$_2$) with an aldehyde group (—C(=O)H) can be employed as the triggering agent. Examples of triggering agents are Lewis acids (e.g., boron trifluoride etherate) and protic acids (i.e., Bronsted acids). Preferably, the triggering agent comprises a protic acid characterizable as having a pKa of 6 or lower, wherein pKa is negative base-10 logarithm of acid dissociation constant, Ka, of the protic acid. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$Br$^-$; FeCl$_3$ (e.g., FeCl$_3$6H$_2$O); HBF$_4$; BF$_3$3O(CH$_2$CH$_3$)$_2$; TiCl$_4$; SnCl$_4$; CrCl$_2$; NiCl$_2$; and Pd(OC(O)CH$_3$)$_2$.

The acid catalyst can be unsupported (no solid support) or supported, i.e. covalently bonded to a solid support. Examples of supported triggering agents are supported curing catalysts such as supported acid catalysts such as acid (H$^+$) forms of cation exchange-type polymer resins (e.g., ethanesulfonic acid, 2-[1-[difluoro[(1,2,2-trifluoroethenyl)oxy]methyl]-1,2,2,2-tetrafluoroethoxy]-1,1,2,2-tetrafluoro-, polymer with 1,1,2,2-tetrafluoroethene sold under trade name NAFION NR50 (E. I. du Pont de Nemours & Co., Inc., Wilmington, Del.) and ethenylbenzenesulfonic acid polymer with diethenylbenzene sold as AMBERLYST15 (Rohm and Haas Co., subsidiary of The Dow Chemical Company, Midland, Mich., USA.).

Application and Curing Conditions

One embodiment provides a method for applying a coating system comprising (I) selecting an epoxy formulation which comprises epoxy resin; curing agent with equal to or less than 4.5 wt % free amine based on a weight solids of the curing agent; and optionally, one or more additives selected from the group consisting of solvent, reactive diluent, plasticizer, pigment, filler; rheology modifiers, dispersants, surfactants, UV stabilizers, and corrosion inhibitors; (II) applying the epoxy formulation onto directly or indirectly onto a substrate; (III) curing the epoxy formulation to produce an epoxy coating layer; (IV) selecting a non-isocyanate polyurethane topcoat formulation; (V) applying the non-isocyanate polyurethane topcoat formulation onto the cured epoxy layer; and (VI) allowing the topcoat formulation to cure thereby forming a topcoat layer. When applied directly onto the substrate, the cured epoxy layer may function as a low free amine primer layer. In certain embodiments, a primer layer is applied directly onto the substrate, wherein the primer layer may have any suitable composition in view of the substrate composition. In such instances, the epoxy layer may function as a mid-coat layer. In various embodiments of the invention, the coating system may comprise one or more layers in addition to the epoxy layer and the non-isocyanate polyurethane layer, provided that the one or more layers are not adjacent to the topcoat layer.

In an alternative embodiment, the instant invention provides a method of applying the coating system, and articles made therefrom, in accordance with any of the preceding embodiments, except that steps (I) through (IV) occur in any order.

In an alternative embodiment, the instant invention provides a method of applying the coating system, and articles made therefrom, in accordance with any of the preceding embodiments, except that steps (I) through (VI) occur in order.

In an alternative embodiment, the instant invention provides a method of applying the coating system, and articles made therefrom, in accordance with any of the preceding embodiments, except that steps (III) and (V) may occur simultaneously.

In an alternative embodiment, the instant invention provides a method of applying the coating system, and articles made therefrom, in accordance with any of the preceding embodiments, except that the curing the epoxy formulation occurs at temperatures from −20 to 80° C. All individual values and subranges are included herein and disclosed herein; for example the epoxy formulation curing temperature can be from a lower limit of −20, 0, 20, 40, or 60° C. to an upper limit of 0, 20, 40, 60 or 80° C. For example, the epoxy formulation may cure at temperatures from −20 to 80° C., or in the alternative, the epoxy formulation may cure at temperatures from −20 to 60° C., or in the alternative, the epoxy formulation may cure at temperatures from 40 to 80° C., or in the alternative, the epoxy formulation may cure at temperatures from 20 to 60° C., or in the alternative, In an alternative embodiment, the instant invention provides a method of applying the coating system, and articles made therefrom, in accordance with any of the preceding embodiments, except that the method further comprises curing the non-isocyanate polyurethane topcoat at a temperature from −20° C. to 80° C. All individual values and subranges are included herein and disclosed herein; for example the non-isocyanate polyurethane topcoat curing temperature can be from a lower limit of −20, 0, 20, 40, or 60° C. to an upper limit of 0, 20, 40, 60 or 80° C. For example, the non-isocyanate polyurethane topcoat may cure at temperatures from −20 to 80° C., or in the alternative, the non-isocyanate polyurethane topcoat may cure at temperatures from −20 to 60° C., or in the alternative, the non-isocyanate polyurethane topcoat may cure at temperatures from 40 to 80° C., or in the alternative, the non-isocyanate polyurethane topcoat may cure at temperatures from 20 to 60° C., or in the alternative, In an alternative embodiment, the instant invention provides a method of applying the coating system, and articles made therefrom, in accordance with any of the preceding embodiments, except that non-isocyanate polyurethane formulation cures within a curing time period of 7 days or shorter. All individual values and subranges from 7 days or less are included herein and disclosed herein. For example, the non-isocyanate polyurethane formulation can cure in a curing time period of 7 days or shorter, or in the alternative, the non-isocyanate polyurethane formulation can cure in a curing time period of 5 days or shorter, or in the alternative, the non-isocyanate polyurethane formulation can cure in a curing time period of 3 days or shorter, or in the alternative, the non-isocyanate polyurethane formulation can cure in a curing time period of 24 hours or shorter, or in the alternative, the non-isocyanate polyurethane formulation can cure in a curing time period of 12 hours or shorter, or in the alternative, the non-isocyanate polyurethane formulation can cure in a curing time period of 1 hour or shorter.

Articles

The instant invention further provides an article comprising: a substrate which comprises a surface: an epoxy coating layer prepared from an epoxy formulation which comprises (A) epoxy resin; (B) curing agent with no more than 4.5 wt % free amine based on weight solids of the curing agent; (C) optionally, one or more additives selected from the group consisting of solvent, reactive diluent, plasticizer, pigment, filler; rheology modifiers, dispersants, surfactants, UV stabilizers, and corrosion inhibitors; wherein the epoxy formulation is coated directly or indirectly onto the surface of the substrate and cured to form an epoxy coating layer; and a non-isocyanate polyurethane coated onto the epoxy coating layer.

In an alternative embodiment, the instant invention provides a coating system, a method of applying the same, and articles made therefrom, in accordance with any of the preceding embodiments, except that the substrate comprises one or more materials selected from the group consisting of wood, composites, concrete, plastics, and metals.

In an alternative embodiment, the instant invention provides a coating system, a method of applying the same, and articles made therefrom, in accordance with any of the preceding embodiments, except that the substrate comprises one or more materials selected from the group consisting of metals and concrete.

In yet another embodiment, the instant invention provides a coating system comprising (A) an epoxy coating layer prepared from an epoxy formulation which consists essentially of (a1) epoxy resin; and (a2) curing agent with no more than 4.5 wt % free amine based on a weight solids of the curing agent; (B) an adjacent coating layer prepared from a non-isocyanate polyurethane formulation; and wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

In yet another embodiment, the instant invention provides a coating system consisting essentially of (A) an epoxy coating layer prepared from an epoxy formulation which comprises (a1) epoxy resin; and (a2) curing agent with no more than 4.5 wt % free amine based on a weight solids of the curing agent; (B) an adjacent coating layer prepared from a non-isocyanate polyurethane formulation; and wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

In another alternative embodiment, the instant invention provides a method of applying a multi-layer coating system consisting of (I) selecting an epoxy formulation which comprises (a1) epoxy resin; (a2) curing agent with no more than 4.5 wt % free amine based on a weight solids of the curing agent; and (II) applying the epoxy formulation onto a substrate; (III) fully or partially curing the epoxy formulation to produce an epoxy coating layer; (IV) selecting a non-isocyanate polyurethane formulation; (V) applying the non-isocyanate polyurethane formulation onto the epoxy coating layer; and (VI) allowing the topcoat formulation and epoxy formulation to fully cure thereby forming a multi-layer coating system; wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

In yet another alternative embodiment, the instant invention provides an article comprising: a substrate which comprises a surface: an epoxy coating layer prepared from an epoxy formulation which consists essentially of an epoxy resin; a curing agent with no more than 4.5 wt % free amine based on weight solids of the curing agent; and a non-isocyanate polyurethane coated onto the epoxy coating layer; wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

In yet another alternative embodiment, the instant invention provides an article consisting essentially of: a substrate which comprises a surface: an epoxy coating layer prepared from an epoxy formulation which comprises an epoxy resin; a curing agent with no more than 4.5 wt % free amine based on weight solids of the curing agent; and a non-isocyanate polyurethane coated onto the epoxy coating layer; wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

EXAMPLES

The following examples illustrate the present invention but are not intended to limit the scope of the invention.
Components for Non-Isocyanate Polyurethane Formulation Used in the Examples
Acrylic Polyol A Acrylic Polyol A was made in a 20-L 316 stainless steel reactor, equipped with dual 45 degree pitched blades, 1-inch thickness baffle cage, hot oil heating system, Mag-drive agitator, and three liquid feed tanks. The reactor was rated for 300 psi pressure capability at 482° F. Feed tank V-600 had a maximum capacity of 2550 ml and was used for xylenes. Feed tank V-602 had a maximum capacity of 3780 ml and was used for monomers solution. Feed tank V-601 had a maximum capacity of 2550 ml and was used for initiator solution.

HEMA, MMA, 2-EHA and AA monomers were weighed out and mixed well in a tank at room temperature. The monomer mix solution was used as one stream and fed from V-602 tank into the reactor. The t-BPA initiator solution came as 50 wt % in mineral spirits, and was diluted to 12.5 wt % with xylenes. The initiator solution was fed from V-601 into the reactor. Monomer Blend: 30% 2-hydroxyethylmethacrylate, 1% acrylic acid, 13% methyl methacrylate, 56% 2-ethylhexylacrylate. The resulting Polyol A had an $M_n$ by GPC of 3600 daltons, and OH# (solid) of 131.4.
Acrylic Polycarbamate A The carbamylation of polyols for all Examples were carried out at 140° C. reaction temperature. Catalyst (dibutyl tin oxide) was used at 0.6 wt % of the total weight of all reaction components. The urea solution is prepared by making a 45% solution in DI water. The urea charge amount is calculated to target 80% conversion of hydroxyl to carbamate and then a 10% excess is used. After the polyol is held at temperature for an hour, dibutyltin oxide catalyst at 0.60% of the total solids is added to the reactor and the urea feed is started. The urea is fed in over 6 hours and the system is held at temperature for an additional 12-16 hours. The material is then poured out of the reactor and the resulting acrylic carbamate is evaluated for percent solids, acid value, hydroxyl number, conversion of hydroxyl to carbamate and molecular weight.

Acrylic polycarbamate A has 81.7% OH conversion and an Mn by GPC of 4200 daltons.

CHDA—1,3/1,4-Cyclohexanedicarboxaldehyde, 96.2% solids with an equivalent weight of 79.2

CYCAT 4040—40% solution of p-toluenesulfonic acid in isopropanol supplied by Cytec Industries, Inc. (Woodland Park, N.J., USA)

Ti-PURE TS6200—titanium dioxide supplied by E. I. du Pont de Nemours and Company (Wilmington, Del., USA)

n-Butyl acetate (n-BA)—supplied by The Dow Chemical Company (Midland, Mich., USA).

Ethanol—supplied by Fisher Scientific Company (Pittsburgh, Pa., USA).

Components for Epoxy Formulation Used in Inventive Examples

D.E.R. 331—Epoxy resin supplied by The Dow Chemical Company having an epoxide equivalent weight of 182-192 g/eq.

GRILONIT H 84026—Isolated EDA adduct with 49 to 51% solid content epoxy curing agent with no free amine, commercially available from EMS-GRILTECH, a subsidiary of EMS-CHEMIE AG (Switzerland).

BYK-9076—a pigment dispersing agent commercially available from BYK Additives & Instruments (Austin, Tex., USA).

BYK-333—a surfactant commercially available from BYK Additives & Instruments.

Red Iron Oxide—is a pigment commercially available from Lanxess Corporation (Orange, Tex., USA).

BLANC FIXE—filler precipitated barium sulfate commercially available from Sachtleben Chemie GmbH (Duisburg, Germany).

L-207A—a micaceous filler commercially available from R.E. Carroll, Inc. (Trenton, N.J., USA).

BENTONE SD-2—is a rheology modifier additive (an organic derivative of a bentonite clay) commercially available from Elementis Specialties, Inc. (East Windsor, N.J., USA).

Butanol—a solvent commercially available from Sigma-Aldrich Corp. (St. Louis, Mo., USA).

Xylene—a solvent commercially available from Fisher Scientific (Pittsburgh, Pa., USA).

Epoxy formulation used in Comparative Examples—VERSAMID 140, a polyamide curing agent commercially available from BASF (Florham Park, N.J., USA), was used in the epoxy formulation.

Procedure to Make Epoxy Formulation Used in Inventive Examples
1. Prepare Salicylic acid 25% solution in ethanol
2. Charge D.E.R. 331 epoxy resin in a speed mixer cup
3. Add dispersant and surfactant
4. Add 8 g glass bead
5. Premix by hand with the wood stick
6. Mix 2 min at 3000 rpm
7. Add Salicylic acid solution if any, Iron Oxide pigment, Barium sulfate, L-207A, and BENTONE SD2
8. Premix by hand with the wood stick
9. Mix 2 min at 3000 rpm, Let the container cool to RT
10. Add Xylene and Butanol
11. Premix by hand with the wood stick
12. Mix 2 min at 3000 rpm, Let the container cool to room temperature (about 24° C.)
13. Add GRILONIT H 84026 curing agent
14. Premix by hand with the wood stick
15. Mix 2 min at 3000 rpm
16. Apply the coating by using #50 wire wound coating applicator to cover the whole panel evenly
17. Cure primed panel at room temperature for 24 hrs before the top coat is applied Procedure for Preparing the Non-Isocyanate Polyurethane Formulation Used in the Inventive and Comparative Examples The coating formulations were prepared in a FlackTek SpeedMixer™ (Model DAC 600 FV-K, FlackTek, Inc.) dual asymmetric centrifuge. The formulation was prepared as follow:
1. The polycarbamate component and pigment were charged into a speed mixer cup
2. Mix 1-2 min at ~3000 rpm or until mixed well
3. Add solvent n-BA and mix 1 min at 3000 rpm
4. Scrape the cup wall and mix 1 min at 3000 rpm
5. Add ethanol and mix 1 min at 3000 rpm
6. Add CHDA and mix 1 min at ~3000 rpm
7. Add p-TSA catalyst and mix 1 min @ ~1500 rpm
8. Mix 1 min @ ~1500 rpm
9. Coat the coating on steel and primed panels by using 10 mil draw down bar
10. Cure for 7 days before the measurement in humidity/temperature control room Iron phosphate treated steel substrates (from Q-panel Company (Westlake, Ohio, USA), Type R-412-I, size: 4×12×0.032 inch) were used. These panels were cleaned with isopropanol thoroughly by using commercially available paper towels, and then air-dried for approximately between 5 to 10 minutes prior to being coated with the non-isocyanate polyurethane top coat or epoxy primer.

Comparative Example 1

The non-isocyanate polyurethane top coat formulation shown in Table 2 was applied directly on a phosphate treated steel panel. The coating was cured for 7 days at about 22° C./50% relative humidity ("50 RH").

In each of Inventive Example 1 and Comparative Example 2, the non-isocyanate polyurethane top coat formulation was coated onto an epoxy layer which was coated onto a phosphate treated steel panel.

Inventive Example 1

The Epoxy primer cured by a curing agent containing low free amine (formulation shown in Table 2) was applied on the phosphate treated steel panel and cured for 24 hrs, then the non-isocyanate polyurethane top coat (formulation shown in Table 1) was applied on top of this epoxy primer and cured for 7 days at about 22° C./50 RH.

Comparative Example 2

The Epoxy primer cured by VERSAMID 140 (formulation shown in Table 3), a polyamide curing agent, was applied on the phosphate treated steel panel and cured for 24 hrs, then the non-isocyanate polyurethane top coat (formulation shown in Table 1) was applied on top of this epoxy primer and cured for 7 days at about 22° C./50 RH.

TABLE 1

Non-Isocyanate Polyurethane Formulation

|  | Solids % | Eq Wt (Solution) | Top coat Formulation (g) |
|---|---|---|---|
| Acrylic Polycarbamte A | 68.2 | 829.3 | 23.46 |
| Crude Dialdehyde | 96.18 | 79.20 | 2.24 |
| Ti-PURE TS-6200 | 100 | — | 7.74 |
| CYCAT 4040 (40% in IPA) |  |  | 0.54 |
| n-BA |  |  | 6.28 |
| Ethanol |  |  | 3.25 |

TABLE 2

Formulation for Epoxy primer containing low free amine

|  | Epoxy primer formulation (g) |
|---|---|
| D.E.R. 331 Epoxy resin | 5.25 |
| BYK-9076 | 0.15 |
| BYK-333 | 0.05 |
| Salicylic acid (25% in ethanol) | 0.42 |
| Iron Oxide Red | 2.95 |
| BLANC FIXE | 5.90 |
| L-207A (Mica filler) | 5.90 |
| BENTONE SD 2 | 0.33 |
| Xylene | 2.95 |
| Butanol | 0.98 |
| GRILONIT H 84026 (curing agent) | 10.67 |

TABLE 3

Formulation for Epoxy primer cured by VERSAMID 140

|  | Epoxy primer Formulation (g) |
|---|---|
| D.E.R. 331 Epoxy resin | 7.67 |
| BYK-9076 | 0.14 |
| BYK-333 | 0.05 |
| Salicylic acid (25% in ethanol) | 0.61 |
| Iron Oxide Red | 2.75 |
| BLANC FIXE | 5.50 |
| L-207A (Mica filler) | 5.50 |
| BENTONE SD 2 | 0.33 |
| Xylene | 6.00 |
| Butanol | 2.00 |
| VERSAMID 140 (curing agent) | 3.18 |

Table 4 shows top coat performance for Inventive Example 1 and Comparative Examples 1 and 2. It can be seen that the Inventive Example 1 coating has similar performance to the coating applied directly on metal (Comparative Example 1) with respect to coating gloss, hardness, MEK resistance, flexibility, adhesion, and water resistance. The topcoat of Comparative Example 2 has decreased coating performance for hardness, MEK resistance, and flexibility.

TABLE 4

Coating Performance Properties

| | Top Coat on Epoxy Primer | | |
|---|---|---|---|
| Coating Performance | Comparative Ex. 1 | Inventive Ex. 1 | Comparative Ex. 2 |
| Top coat thickness (mils) | 2.92 | 2.54 | 2.73 |
| 60° gloss | 87.2 | 84.4 | 88.4 |
| Pencil Hardness | HB | HB | <6B |
| Konig Hardness [sec] (24 hr) | 34 | 31 | 11 |
| Konig Hardness [sec] (7 Day) | 65 | 65 | 16 |
| Cross hatch adhesion | 4 | 4 | 4 |
| MEK Resistance [double rubs] 25% Film Loss or 200 rubs | >200 | >200 | 40 |
| Water Resistance (24 hr) covered | 3 | 4 | 4 |
| Direct impact Resistance (in-lbs) | 50 | 50 | 30 |
| Indirect impact Resistance (in-lbs) | 10 | 10 | <10 |
| Mandrel Bend (0.5 in) Pass/Fail | P | P | P |

Test Methods

Test methods include the following:
Dry Film Thickness Measurements

Dry film thickness was measured by using thickness meter Positector 6000. The data recorded was from the average of five measurements.

Gloss

Gloss is measured using a BYK micro-TM-gloss instrument. Gloss is a measure of light reflectance of a coating at defined angles. Gloss is measured at 60°.

Pencil Hardness and Pendulum Hardness

Pencil hardness testing was performed according to ASTM D3363 method. The Pencil Hardness Tester is supplied with a series of 14 pencils ranging from 6 B to 6 H, from softest to hardest.

Pendulum hardness testing is performed according to ASTM D4366 method, and average of 3 measurements are averaged and reported.

Cross-Hatch Adhesion

Cross-hatch adhesion was measured and rated according to ASTM D-3359. Specific ASTM ratings for the adhesion test are shown in Table 5. Adhesion ratings of 4 B and 5 B are desired.

TABLE 5

ASTM D3359 classification for adhesion

| Rating | Percent of Coating Removed |
|---|---|
| 5B | 0% (Perfect adhesion) |
| 4B | <5% |
| 3B | 5-15% |
| 2B | 15-35% |
| 1B | 35-65% |
| 0B | >65% |

MEK Double Rubs

Solvent resistance and degree of crosslinking is evaluated by using a semi-automated MEK rub test machine (DJH Designs Inc.). The coated substrates were rubbed with a cloth soaked in methyl ethyl ketone (MEK) that is attached to the rubbing block. Each back and forth rub counts as one double rub. This machine applies constant downward pressure (80 psi), constant speed (70 double rubs/min) and counts the number of double strokes applied.

Water Resistance

Water resistance was tested by exposing the coatings to DI water, with methodology similar to ASTM D1308. A big DI water droplet was placed on the coating surface and covered with a watch glass for 24 hrs. After 24 hrs, the water was wiped off the coating. The coating was visually inspected for any signs of color change, staining, blistering, etc. The coating was rated as a 5 (no effect) through 1 (severe blistering or completely dissolved).

Impact Resistance

The impact resistance of the coating was determined by using a Gardner impact tester according to ASTM D2794.

Mandrel Bend Test

The mandrel bend test is to evaluate the coating's resistance to cracking (flexibility). The coated panels are bent over a mandrel and the resistance to cracking of the coating is determined. In this study, we record if the coating pass or fail the mandrel with 0.5' diameter.

The present invention may be embodied in other forms without departing from the spirit and the essential attributes thereof, and, accordingly, reference should be made to the appended claims, rather than to the foregoing specification, as indicating the scope of the invention.

We claim:

1. A method of applying a multi-layer coating system comprising:
    (I) selecting an epoxy formulation which comprises
        (a1) epoxy resin;
        (a2) curing agent selected from the group consisting of amine adducts, amides, polyamides, and Mannich bases derived from polyfunctional amines with no more than 4.5 wt % free amine based on a weight solids of the curing agent; and
    (II) applying the epoxy formulation onto a substrate;
    (III) fully or partially curing the epoxy formulation to produce an epoxy coating layer;
    (IV) selecting a non-isocyanate polyurethane formulation;
    (V) applying the non-isocyanate polyurethane formulation onto the epoxy coating layer; and
    (VI) allowing the topcoat formulation and epoxy formulation to fully cure thereby forming a multi-layer coating system;
    wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

2. The method according to claim 1, wherein the epoxy formulation is fully cured in step (III).

3. The method according to claim 1, further comprising selecting and applying one or more
    additional coating layers provided such one or more additional coating layers are not adjacent to or touching upon the topcoat layer.

4. The method according to claim 1, wherein the curing the epoxy formulation occurs at temperatures from −20 to 80° C.

5. The method according to claim 1, further comprising curing the topcoat at a temperature from −20° C. to 80° C.

6. An article comprising:
    a substrate which comprises a surface:
    an epoxy coating layer prepared from an epoxy formulation which comprises an epoxy resin;
    a curing agent selected from the group consisting of amine adducts, amides, polyamides, and Mannich bases derived from polyfunctional amines with no more than 4.5 wt % free amine based on weight solids of the curing agent; and
    a non-isocyanate polyurethane coated onto the epoxy coating layer;
    wherein the epoxy formulation and/or non-isocyanate polyurethane formulation optionally further comprise one or more additives selected from the group consisting of solvent, reactive diluent, plasticizer, pigment, filler; rheology modifiers, dispersants, surfactants, UV stabilizers, and corrosion inhibitors.

7. The article according to claim 6, wherein the substrate comprises one or more materials selected from the group consisting of wood, composites, concrete, plastics, and metals.

8. The article according to claim 7, wherein the substrate comprises one or more materials selected from the group consisting of metals and concrete.

* * * * *